(12) United States Patent
Cheng et al.

(10) Patent No.: US 11,921,474 B2
(45) Date of Patent: Mar. 5, 2024

(54) VIRTUAL METROLOGY METHOD USING CONVOLUTIONAL NEURAL NETWORK AND COMPUTER PROGRAM PRODUCT THEREOF

(71) Applicant: NATIONAL CHENG KUNG UNIVERSITY, Tainan (TW)

(72) Inventors: Fan-Tien Cheng, Tainan (TW); Yu-Ming Hsieh, Kaohsiung (TW); Tan-Ju Wang, Tainan (TW); Li-Hsuan Peng, Tainan (TW); Chin-Yi Lin, Taipei (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 402 days.

(21) Appl. No.: 17/329,187

(22) Filed: May 25, 2021

(65) Prior Publication Data

US 2022/0026861 A1    Jan. 27, 2022

Related U.S. Application Data

(60) Provisional application No. 63/055,347, filed on Jul. 23, 2020.

(30) Foreign Application Priority Data

Mar. 29, 2021    (TW) .................................. 110111380

(51) Int. Cl.
*G05B 13/02* (2006.01)
*G06N 3/08* (2023.01)

(52) U.S. Cl.
CPC .............. *G05B 13/027* (2013.01); *G06N 3/08* (2013.01)

(58) Field of Classification Search
CPC ........ G05B 13/027; G05B 2219/32193; G05B 2219/32194; G05B 19/41875; G06N 3/08; G06N 3/045; Y02P 90/02; G06F 30/27
See application file for complete search history.

(56) References Cited

U.S. PATENT DOCUMENTS

| | | | |
|---|---|---|---|
| 2012/0029662 A1* | 2/2012 | Cheng .............. | G05B 19/41835 700/29 |
| 2016/0274570 A1* | 9/2016 | Shih ................. | G05B 19/41875 |
| 2022/0004174 A1* | 1/2022 | Kaira ....................... | G06F 18/23 |

FOREIGN PATENT DOCUMENTS

JP          6814981 B2 *  1/2021   ............. G06F 17/16

* cited by examiner

*Primary Examiner* — Chad G Erdman
(74) *Attorney, Agent, or Firm* — CKC & Partners Co., LLC (57) ABSTRACT

A virtual metrology method using a convolutional neural network (CNN) is provided. In this method, a dynamic time warping (DTW) algorithm is used to delete unsimilar sets of process data, and adjust the sets of process data to be of the same length, thereby enabling the CNN to be used for virtual metrology. A virtual metrology model of the embodiments of the present invention includes several CNN models and a conjecture model, in which plural inputs of the CNN model are sets of time sequence data of respective parameters, and plural outputs of the CNN models are inputs to the conjecture model.

8 Claims, 8 Drawing Sheets

VIRTUAL METROLOGY METHOD USING CONVOLUTIONAL NEURAL NETWORK AND COMPUTER PROGRAM PRODUCT THEREOF

RELATED APPLICATIONS

The present application is based on, and claims priority from Taiwan Application Serial Number 110111380, filed Mar. 29, 2021 and the Provisional Application Ser. No. 63/055,347, filed on Jul. 23, 2020, the entire contents of each of which are incorporated by reference.

BACKGROUND

Field of Invention

The present disclosure relates to a virtual metrology method using a convolutional neural network (CNN) and a computer program product thereof. More particularly, the present disclosure relates to a virtual metrology method based on a convolutional neural network (CNN) by using a dynamic time warping (DTW) algorithm and a computer program product thereof.

Description of Related Art

Virtual metrology has been quite widely applied in various industries, such as a semiconductor industry and a tooling industry. Virtual metrology can convert sampling inspections with metrology delay into real-time and on-line total inspections. For example, when virtual metrology is introduced into a wafer-sawing process in the semiconductor industry, process abnormalities can be found in real time and can be improved in time, thereby preventing an entire wafer lot from being scrapped subsequently. When virtual metrology is introduced into a machine tool, the quality precision of each processed workpiece (such as a vehicle wheel) can be conjectured for meeting the requirements real time and accuracy, thereby predicting the processing quality of the machine tool to overcome the shortcomings of the conventional in-line metrology and off-line metrology.

Although the conventional virtual metrology may be mostly suitable for its expected purposes, yet it still does not meet the requirements in various aspects.

SUMMARY

An object of the present disclosure is to provide a virtual metrology method using a convolutional neural network (CNN) and a computer program product thereof, thereby effectively using the CNN to perform virtual metrology for promoting the accuracy of virtual metrology compared to that of the conventional virtual metrology.

According to an aspect of the present disclosure, a method for a virtual metrology method using a convolutional neural network (CNN). In this virtual metrology method, plural sets of process data are obtained, in which the sets of process data are used or generated by a production tool when plural workpieces are processed by the production tool, and the sets of process data are one-to-one corresponding to the sets of workpieces, and each of the sets of process data comprises values of plural parameters, and the values of each of the parameters are respectively corresponding to plural sets of time series data of the workpieces. Then, a data alignment operation is performed onto the sets of process data. In the data alignment operation, a frequency distribution calculation is performed with respect to a data length of each of the sets of time series data of each of the parameters, thereby obtaining a distribution of appearance frequencies versus data lengths, in which the data length with the largest appearance frequency in the sets of time series data of each of the parameters is a reference data length. Thereafter, a mean calculation is performed on the sets of time series data with the reference data length in the sets of time series data of each of the parameters, thereby obtaining a set of reference time series data of each of the parameters. Then, a distance between each of the sets of time series data of each of the parameters and its corresponding reference time series data is calculated by using a dynamic time warping (DTW) algorithm. Then, a distance threshold is set, and the set of process data corresponding to the distance is deleted when the distance is greater than the distance threshold. Thereafter, a data-length adjusting operation is performed to repeat adding at least one data point having the value of an end data point of each of the sets of time series data of each of the parameters after the end data point until the data length of each of the sets of time series data of each of the parameters is equal to a longest data length of the sets of process data. Then, plural actual measurement values of the workpieces are obtained. A model-building operation is performed to build a virtual metrology model by using the sets of process data and the actual measurement values, the virtual metrology model comprising at least one CNN model. Thereafter, after the data alignment operation is performed on another set of process data of another workpiece, inputting the another set of process data of the another workpiece into the virtual metrology model to compute a virtual metrology value of the another workpiece.

In some embodiments, the aforementioned virtual metrology method further includes setting an upper limit of data length before the data-length adjusting operation is performed; and deleting at least one of the sets of the process data if the data length of the at least one of the sets of the process data is greater than the upper limit of data length.

In some embodiments, the upper limit of data length is $Q3+k \times IQR$, wherein $Q3$ stands for a third quartile of data lengths in the distribution of appearance frequencies versus data lengths which are arranged from smallest to largest, and $IQR$ stands for an interquartile range in the distribution of appearance frequencies versus data lengths which are arranged from smallest to largest, and $k$ is a constant greater than 0.

In some embodiments, an operation of setting the distance threshold is performed by applying a cross validation's leave-one-out (LOO) method.

In some embodiments, the virtual metrology model includes plural CNN models and a conjecture model, in which plural inputs are the sets of time series data of the parameters, and plural outputs of the CNN models are inputs of the conjecture model.

In some embodiments, the conjecture model is built in accordance a neural network (NN) algorithm, a multi-regression (MR) algorithm, a partial least square (PLS) algorithm or a support vector machines (SVM) algorithm.

According to another aspect of the present disclosure, a computer program product stored on a non-transitory tangible computer readable recording medium is provided. When this computer program product is loaded and executed by a computer, the aforementioned method is performed.

Hence, the application of the embodiments of the present disclosure can effectively use the CNN to perform virtual metrology, thus promoting the accuracy of virtual metrology compared to that of the conventional virtual metrology.

BRIEF DESCRIPTION OF THE DRAWINGS

The invention can be more fully understood by reading the following detailed description of the embodiment, with reference made to the accompanying drawings as follows.

DESCRIPTION OF THE PREFERRED EMBODIMENTS

Reference will now be made in detail to the embodiments of the present invention, examples of which are illustrated in the accompanying drawings. Wherever possible, the same reference numbers are used in the drawings and the description to refer to the same or like parts.

As the processes become more and more sophisticated, the requirement for the accuracy of virtual metrology becomes higher. The conventional virtual metrology uses a back-propagation neural networks (BPNN) algorithm. However, even if the amount of model-building sample data increases greatly, the performance of the conventional virtual metrology can only be improved to a certain extent. The BPNN algorithm also requires a strict and time-consuming feature selection process. On the other hand, the accuracy of a convolutional neural networks (CNN) algorithm improves as the amount of model-building sample data grows. If there are sufficient model-building sample data, the performance of the virtual metrology model built by the CNN algorithm will be greatly improved. Moreover, the CNN algorithm can automatically extract highly informative data features from the sample data. Thus, when the CNN algorithm is used for virtual metrology, not only the accuracy of the virtual metrology can be increased, but also the time and manpower for feature extraction can be saved. However, the input values of the CNN algorithm are required to have the same data lengths and similar temporal distribution profiles. When the CNN algorithm is used to perform virtual metrology, the problems of different data lengths and unsimilar temporal distribution profiles among the inputted process data for the CNN algorithm have to be first overcome.

Embodiments of the present disclosure use plural sets of model-building samples to build a virtual metrology model according to a CNN algorithm. Each set of model-building samples includes a set of process data and an actual measurement value. The sets of process data are generated or used by a production tool when the production tool is processing workpieces. The sets of process data are one-to-one corresponding to the workpieces. The actual measurement value is obtained after one of the quality items of each workpiece is measured by a metrology tool. For a wafer manufacturing process, the production tool is a wafer processing tool, such as an etch tool, a deposition tool, or a sputter tool, etc.; the actual measurement value (quality item) is a film thickness, an etch depth, or an etched sidewall angle, etc.; the process data include temperatures. For a wafer sawing process, the production tool is a wafer cutting tool; the actual measurement value (quality item) is a wafer-chipping amount; and the process data include blade clogging, a coolant flow rate, a spindle speed (RPM), a feeding rate, wafer conditions (such as thickness, coating, etc.), and/or a kerf width. For the tool processing, the production tool is a machine tool; the actual measurement value(s) (quality item(s)) include(s) roughness, straightness, angularity, perpendicularity, parallelism and/or roundness; and the process data include a working current, and/or vibration data and/or audio frequency data obtained by three-axis accelerometer sensors or acoustic sensors mounted on the machine tool.

Figure 1:
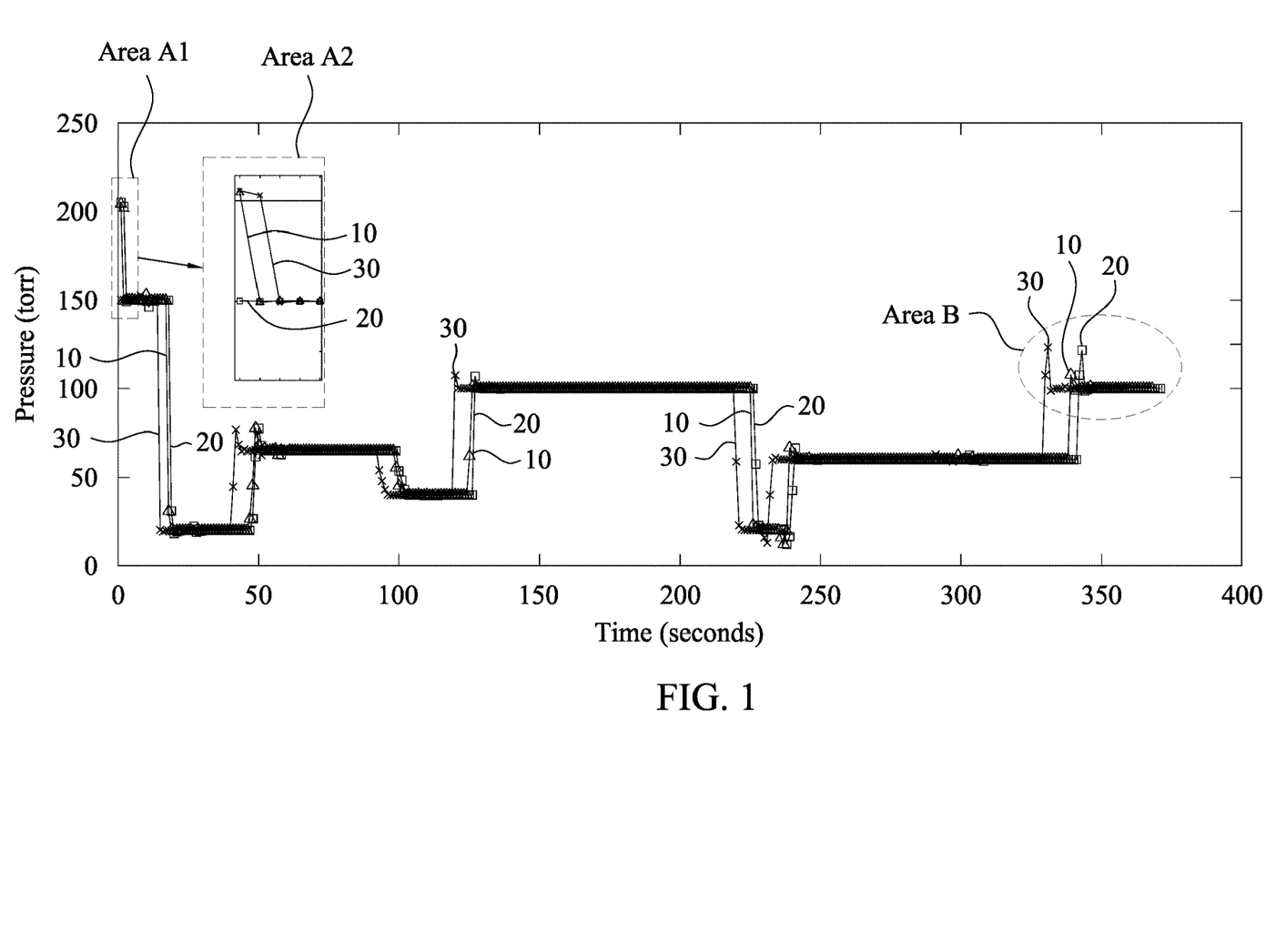
FIG. 1 shows an exemplary set of original process data of a pressure parameter in an etch process.

Each set of time series data of each parameter of each set of process data is obtained by using a sensor that performs detection on a workpiece at a sampling rate when a process is performed. Referring to FIG. 1, FIG. 1 shows an exemplary set of original process data of a pressure parameter in an etch process, in which a curve 10 denoted by triangles represents a set of time series data of pressure (parameter) in a reaction chamber for workpiece sample 1 that is being etched; a curve 20 denoted by squares represents a set of time series data of pressure (parameter) in the reaction chamber for workpiece sample 2 that is being etched; and a curve 30 denoted by "x" represents a set of time series data of pressure (parameter) in the reaction chamber for workpiece sample 3 that is being etched. As shown by area B in FIG. 1, even with the same etch process recipes, the sets of time series data of pressure (parameter) for workpiece samples 1, 2 and 3 still have different data lengths, and thus cannot be used for building a CNN model. As shown by an area A1 and an enlarged area A2 in FIG. 1, in the beginning of the process, the initial pressure of workpiece sample 3 is not as high as the initial pressures of workpiece sample 3, due to the sensor lag that causes the miss-reporting of the first two seconds of data during the collection of workpiece sample 3 values. As the temporal distribution profiles of the process data of workpiece samples 1, 2 and 3 are not similar, they may contaminate the CNN model and affect the accuracy of the CNN model if they are included for building the CNN model.

Therefore, the disclosure provides an automated data alignment scheme (ADAS) to delete the sets of process data of which the temporal distribution profiles are not similar to each other and enable the data lengths of the sets of process data to be the same.

The virtual metrology, global similarity index, $DQI_x$ (process data quality index), $DQI_y$ (metrology data quality index) and dual-phase virtual metrology used in embodiments of the disclosure hereinafter may refer to U.S. Pat. No. 8,095,484 B2. U.S. Pat. No. 8,095,484 B2 is hereby incorporated by reference.

Figure 2:
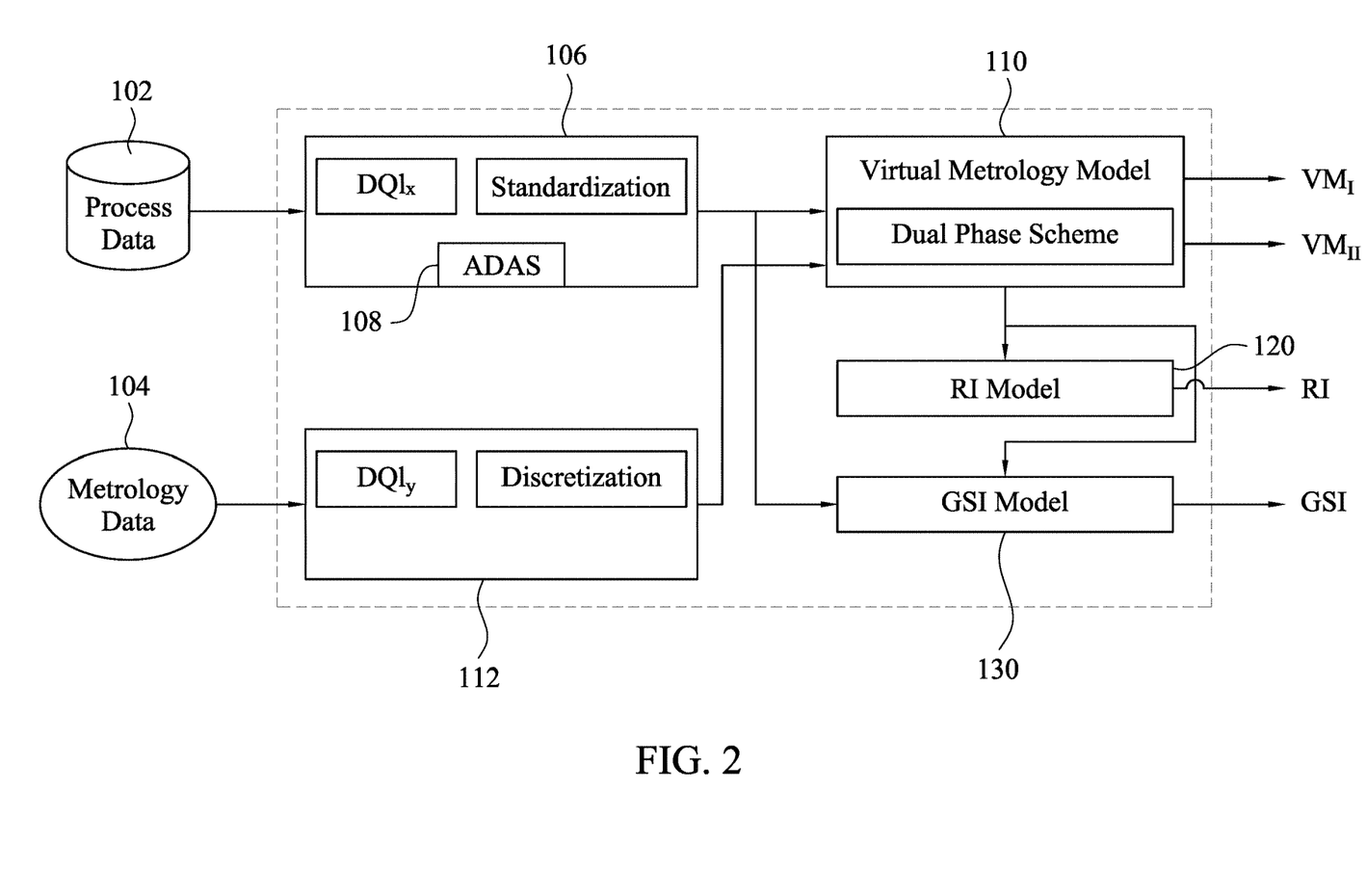
FIG. 2 is schematic block diagram for explaining a virtual metrology application according to some embodiments of the disclosure.

Referring to FIG. 2, FIG. 2 is schematic block diagram for explaining a virtual metrology application according to some embodiments of the disclosure. At first, the aforementioned plural sets of process data 102 for historical workpieces are obtained from a production tool. A process data preprocessing operation 106 performs a data alignment operation based on an automated data alignment scheme (ADAS) on the sets of process data 102, thereby deleting the sets of process data 102 of which the temporal distribution profiles are not similar to each other. Before or after the data alignment operation, the process data preprocessing operation 106 may perform data quality evaluation on the set of process data 102 based on the $DQI_x$ model, and arranges and standardizes (z-score) the original process data 102 from the production tool. A metrology data preprocessing operation 112 performs data quality evaluation on metrology data 104 (i.e. the aforementioned actual measurement values) based on the $DQI_y$ model, and performs discretization and selection on the metrology data to delete the abnormal values therein. Then, the metrology data 104 and the aligned process data 102 of the historical workpieces are used as a set of model-building samples for building a virtual metrology model 110, a RI model 120, and a GSI model 130, in which the virtual metrology model 110 includes a CNN model, and has a dual-phase scheme. After the virtual metrology model 110, the RI model 120, and the GSI model 130 are built, virtual metrology may be performed on subsequent workpieces. After a set of process data 102 of a workpiece is obtained, the process data preprocessing operation 106 performs the data alignment operation on the set of process data 102 of the workpiece and/or other data preprocesses. Thereafter, the treated process data 102 are inputted into the RI model 120, and the GSI model 130, so as to calculate a first phase virtual metrology value ($VM_I$) of the workpiece and its RI value and GSI value. After the workpiece has been processed by the production tool, if a quality item of the workpiece is measured by the metrology tool and its metrology data 104 (i.e. an actual measurement value) is obtained, then the process data 102 and metrology data 104 of the workpiece can be used to retrain or retune (adjust) the virtual metrology model 110, the RI model 120 and the GSI model 130, calculate a second phase virtual metrology value ($VM_{II}$) of the workpiece and its RI value and GSI value.

Hereinafter, a data alignment operation based on the ADAS 108 is explained.

Figure 3A:
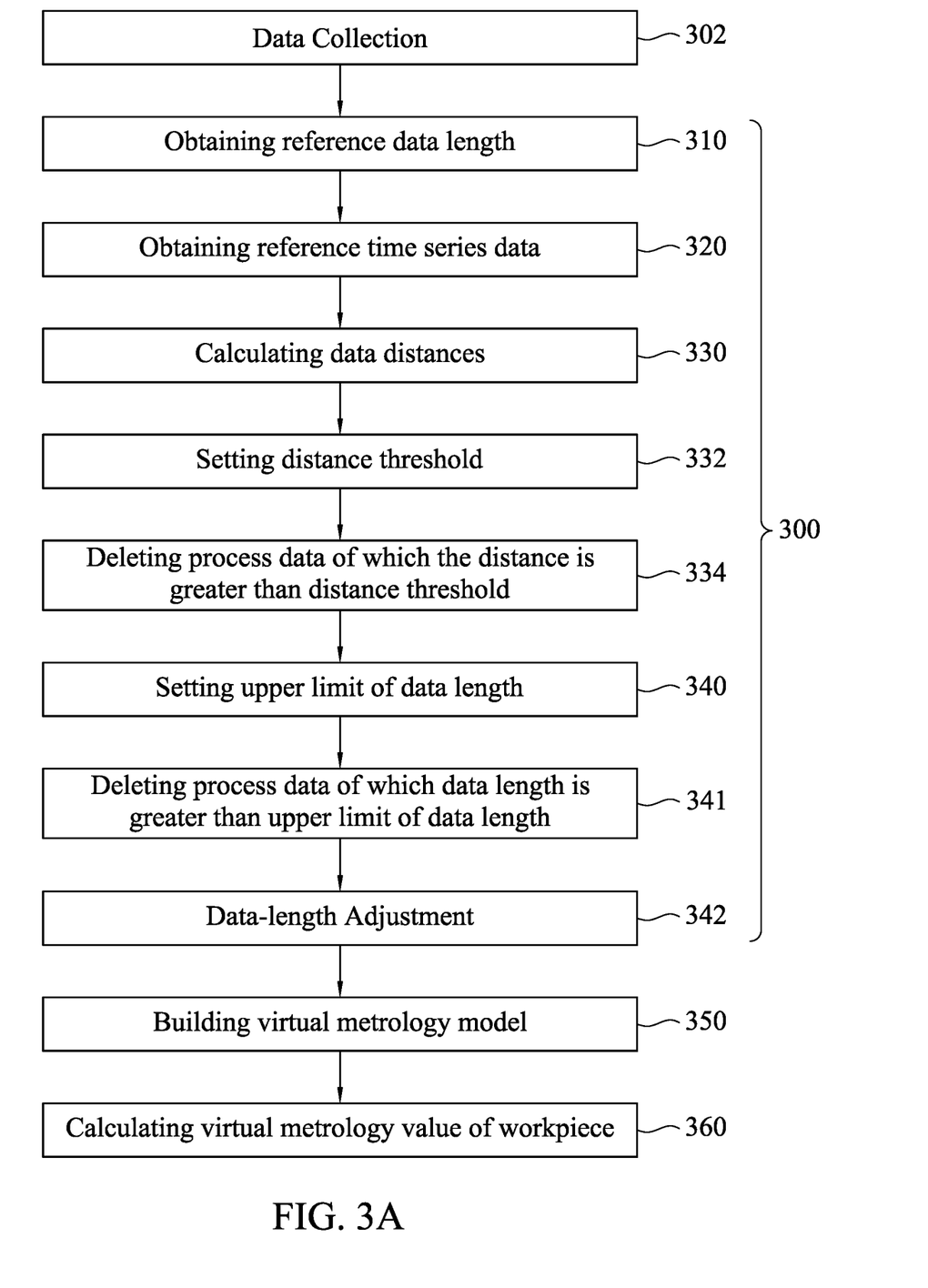
FIG. 3A is a flow chart showing a virtual metrology method based on an automated data alignment scheme (ADAS) according to some embodiments of the disclosure.

Referring to FIG. 3A, FIG. 3A is a flow chart showing a virtual metrology method based on the automated data alignment scheme (ADAS) 108 according to some embodiments of the disclosure. Before a data alignment operation 300 is performed, a data collection operation 302 is performed to obtain plural sets of process data, in which the sets of process data are used or generated by a production tool when a plurality of workpieces are processed by the production tool, and the sets of process data are one-to-one corresponding to the sets of workpieces. Each set of process data includes values of plural parameters, and the values of each parameter are respectively corresponding to a plurality of sets of time series data of the workpieces. In the data alignment operation 300, an operation 310 of obtaining a reference data length is performed, in which a frequency distribution calculation is performed with respect to a data length of each set of time series data of each parameter, thereby obtaining a distribution of appearance frequencies versus data lengths, in which the data length with the largest appearance frequency in the sets of time series data of each parameter is the reference data length. Thereafter, an operation 320 of obtaining a set of reference time series data is performed, in which a mean calculation is performed on the sets of time series data with the reference data length in the sets of time series data of each parameter, thereby obtaining a set of reference time series data of each parameter.

Figure 3B:
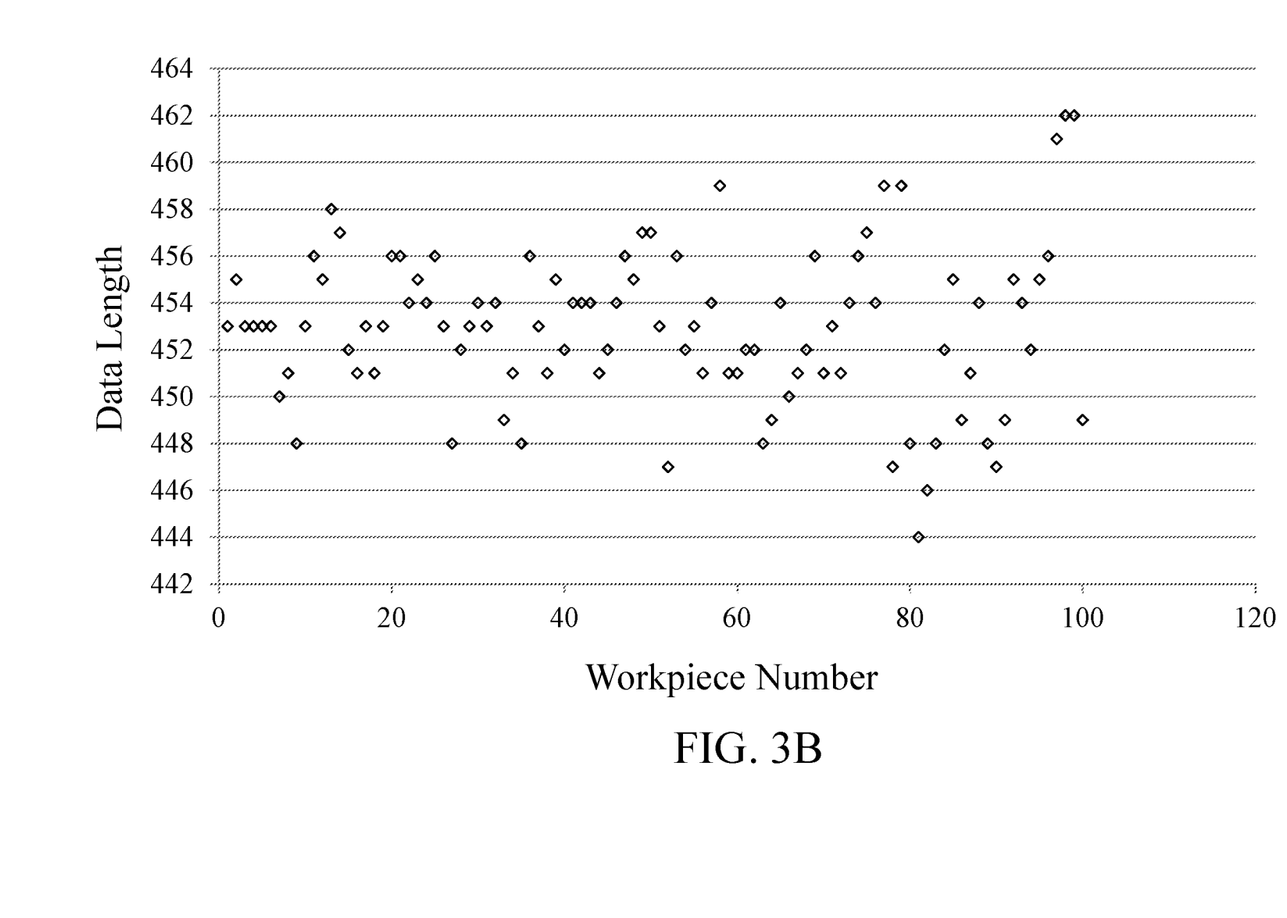
FIG. 3B shows data lengths of process data of respective workpieces according to an application example of the disclosure.
Figure 3C:
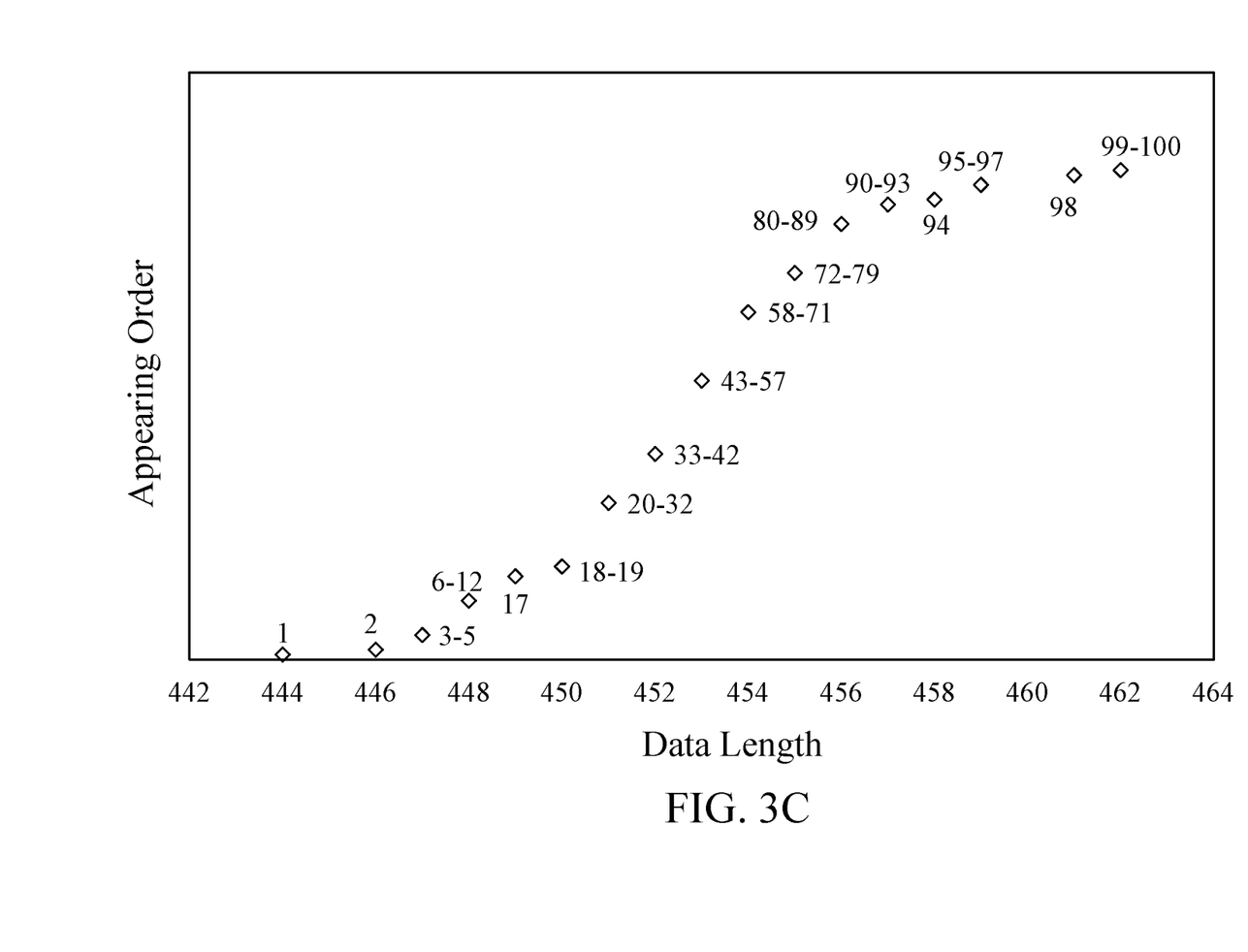
FIG. 3C shows a distribution of appearance frequencies versus data lengths for the process data according to the application example.

In the below, an application example is used to explain the operation 310 of obtaining the reference data length and the operation 320 of obtaining the set of reference time series data. Referring to FIG. 3B and FIG. 3C, FIG. 3B shows data lengths of process data of respective workpieces according to an application example of the disclosure; and FIG. 3C shows a distribution of appearance frequencies versus data lengths for the process data according to the application example. As shown in FIG. 3B, this application example provides 100 sets of data of a certain parameter for 100 workpieces respectively, each set of data of the parameter in each set of process data is such as the set of time series data shown in FIG. 1, in which the data lengths of the sets of time series data of the workpieces for the parameter are ranged from 444 data points to 462 data points. After the frequency distribution calculation, the distribution of appearance frequencies versus data lengths as shown in FIG. 3C is obtained, in which the data length appearing most often (that appears fifteen times, i.e. has the largest appearance frequency) is 453 data points, and thus the reference data length is 453 data points, and there are fifteen workpieces of which the data lengths of the process data are 453 data points. After the mean calculation is performed on the sets of time series data of these fifteen workpieces, a set of reference time series data for the parameter is obtained. Similarly, sets of reference time series data for the other parameters can be obtained as described above.

As shown in FIG. 3A, after the set of reference time series data of each parameter is obtained, an operation 330 of calculating data distances is performed, in which a dynamic time warping (DTW) algorithm is used to calculate a distance between each of the sets of time series data of each of the parameters and its corresponding reference time series data. The DTW calculates the similarity between two sets of time series data by extending and/or shortening the time series, and it is widely adopted for speech recognition and language recognition to distinguish whether two sets of voice data represents the same word. Take the semiconductor pressure data of dry etch shown in FIG. 1 for instance. Suppose there are two sets of pressure time series data (temporal data) of workpiece sample 1 and workpiece sample 3, and let the set of pressure time series data of workpiece sample 1 is $A=[a_1, \ldots, a_n]$ of length $n \in R$, and the set of pressure time series data of workpiece sample 3 is $B=[b_1, \ldots, b_m]$ of length $m \in R$, where A is the reference time series data and B is the testing time series data (i.e. each set of time series data of each parameter). A warping path P between two sets of time series (temporal) data contains the indexes of the aligned elements, i.e., a sequence $P=[p_1, p_2, \ldots, p_K]$, with $p_K=(i_K, j_K) \in [1:n] \times [1:m]$ for $k \in [1:K]$ satisfying the following constraints:

Boundary constraint: $p_1=(1, 1)$, $p_K=(n, m)$;

Step size and direction constraint: $(p_{k+1}-p_k) \in \{(1, 0), (0, 1), (1, 1)\}$ for $k \in [1:K-1]$.

The length of the warping path P satisfies $\max(n, m) \leq K \leq n+m$. The set of all warping paths between A and B is denoted by $P_{m,n}$. The warping cost $d(A, B)$ of the warping path P is defined as follows:

$$d(A,B)=\Sigma_{p=1}^{P} d(a_{ik}, b_{jk}) \tag{1}$$

where $d(.,.)$ is the distance measure (function). In some embodiments, a squared Euclidean distance is utilized as the distance measure, i.e. $d(a_i, b_j)=\sqrt{(a_i, b_j)^2}$. In order to acquire the optimal warping path, a n×m accumulated cost matrix D is constructed, which is calculated by the following formula:

$$D_{i,j} = d(a_i, b_j) + \min \begin{cases} D_{i-1,j-1} \\ D_{i-1,j} \\ D_{i,j-1} \end{cases} \tag{2}$$

According to the above formula, the distance (accumulated cost matrix) between the set of pressure time series (temporal data) of the workpiece sample 3 and the reference time series data (the set of pressure time series data of the workpiece sample 1) is 199.79, and the distance (accumulated cost matrix) between the set of pressure time series (temporal data) of the workpiece sample 2 and the reference time series data (the set of pressure time series data of the workpiece sample 1) is 152.29. It is noted that the smaller the distance of warping path is, the more similar the two sets of data are. Thus, workpiece sample 2 is more similar to workpiece sample 1 than workpiece sample 3 is. It is worthy to be noted that a Mahalanobis distance or other algorithms also can be utilized as the distance measure (function).

Thereafter, an operation 332 is performed to set a distance threshold. When the distance (data distance) between a set of time series data of a parameter of a workpiece and its corresponding reference time series data is greater than the distance threshold, an operation 334 is performed to delete the set of (historical) process data (time series data) corresponding to the distance, i.e. the set of process data is not similar to other process data, and is not suitable for model building. The operation 332 of setting the distance threshold ($DTW_T$) can be calculated by using a cross validation's leave-one-out (LOO) method as follows:

$$DTW_T = \overline{DTW}_{LOO} + \alpha \times \sigma_{DTW_{LOO}} \qquad (3)$$

where $\overline{DTW}_{LOO}$ is the mean of the distances between respective sets of time series data of each parameter and its reference time series data; and $\sigma_{DTW_{LOO}}$ is the standard deviation of the distances between respective sets of time series data of each parameter and its reference time series data, and they are calculated by the LOO method from all the training samples model-building sample data. The value of $\alpha$ in equation (3) is obtained by the Chebyshev's theorem as flows:

$$P(\overline{DTW}_{LOO} + \alpha \times \sigma_{DTW_{LOO}} \leq DTW_T) \leq \frac{1}{\alpha^2} = \lambda \qquad (4)$$

When the abnormal data (which are greater than $DTW_T$ is distinguished from the normal ones (which are smaller than or equal to $DTW_T$, threshold with 95% reliance index (typically $\lambda=0.05$) for $\overline{DTW}_{LOO}$ and $\sigma_{DTW_{LOO}}$ i.e., $$\alpha = \frac{1}{\sqrt{\lambda}} = 4.472,$$

is finally obtained by the Chebyshev's inequality (4). Then, $\alpha=4.472$ is inputted into equation (3) to get the $DTW_T$.

Then, referring to FIG. 3A again, an operation 340 is performed to set an upper limit of data length. In some embodiments, the upper limit of data length is Q3+k×IQR, in which Q3 stands for a third quartile of data lengths in the distribution of appearance frequencies versus data lengths which are arranged from smallest to largest, and IQR stands for an interquartile range in the distribution of appearance frequencies versus data lengths which are arranged from smallest to largest, and k is a constant greater than 0, such as 1.5. As shown in FIG. 3C, among the 100 workpieces, the third quartile of data lengths in the appearing order is the data length of the 75$^{th}$ workpiece, i.e. Q3 is 451 data points; and IQR=455+1.5×4=461 data points. Thereafter, an operation 341 is performed to delete at least one of the sets of the process data if the data length of the at least one of the sets of the process data is greater than the upper limit of data length (461 data points), i.e. the sets of process data of the 99$^{th}$ and 100$^{th}$ workpieces.

Then, a data-length adjusting operation 342 is performed to repeat adding at least one data point having the value of an end data point of each set of time series data of each parameter after the end data point until the data length of each set of time series data of each parameter is equal to a longest data length of the sets of process data.

Thereafter, a model-building operation 350 is performed to build a virtual metrology model by using the sets of process data and the actual measurement values of the workpieces, in which the virtual metrology model includes at least one CNN model. Then, a prediction operation 360 is performed. In the prediction operation 360, at first, a set of process data of a next workpiece is obtained, and then the data alignment operation 300 is performed on the set of process data of the next workpiece. Thereafter, the set of process data of the next workpiece is inputted into the virtual metrology model to calculate a virtual metrology value of the next workpiece.

The CNN model is typically composed of a convolutional layer, a pooling layer, a flatten layer and/or a dropout layer, and a fully-connected (FC) layer, in which the FC layer includes at least one hidden layer and an output layer. Since the CNN model or algorithm is well known to persons of ordinary skill in the art, the details of the CNN model or algorithm will be described herein. As for the structure of BPNN, it can be regarded as the FC layer in the CNN only. Since the BPNN does not have the convolutional and pooling layers, a feature selection process is required to extract the features. Generally, in the semiconductor manufacturing process, each recipe step is pre-processed for mean, max, min, range, and standard deviation before the feature selection process is performed. Therefore, it is impossible for the BPNN to acquire and learn the subtle changes in the parameters. In contrast, in actual applications, the CNN's input data are the temporal data that hold the most abundant information. The CNN automatically extracts subtle yet important features from temporal data through the convolutional and pooling layers. After these features are flattened, they are used as the input of the FC layer to get the prediction result. With a clear causal relationship, the accuracy of CNN can be improved, and this phenomenon will become more significant with growing amount of data.

Figure 4:
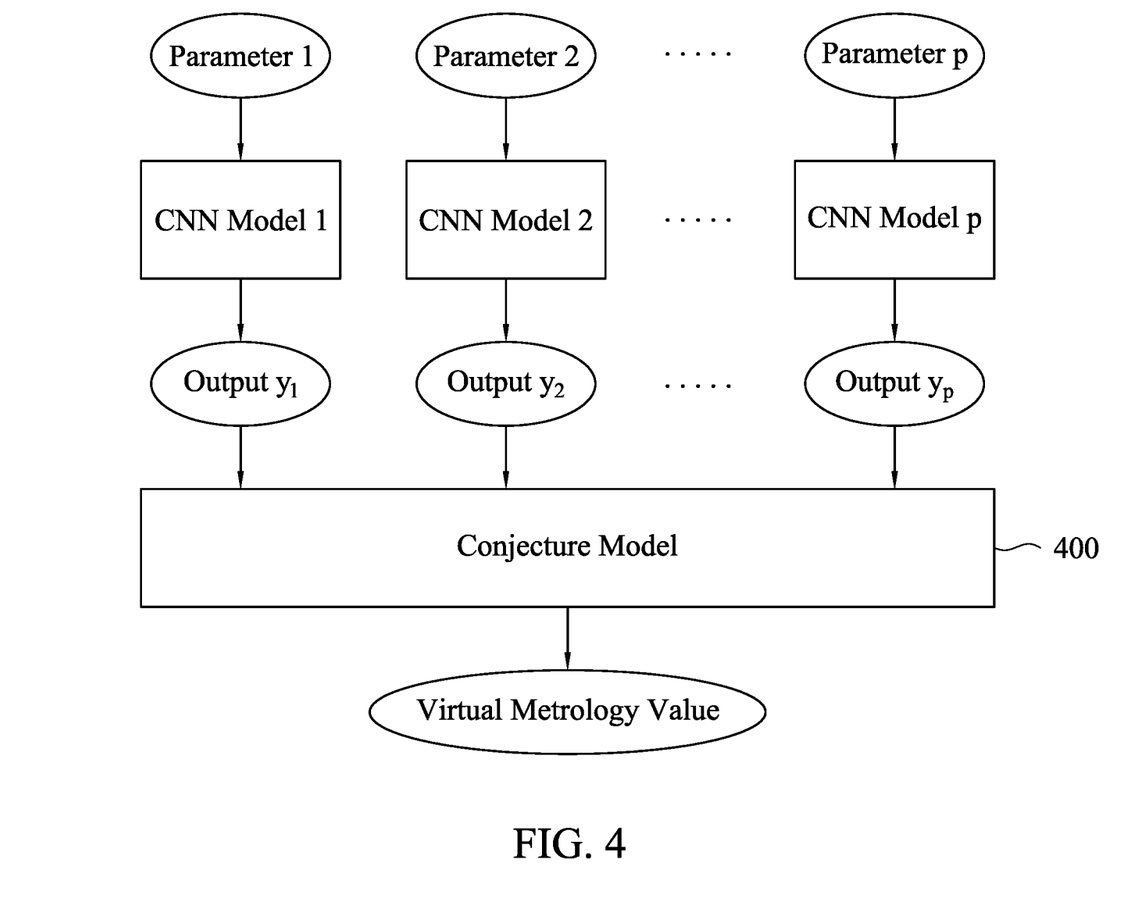
FIG. 4 is schematic diagram showing an ensemble virtual metrology model according to some embodiments of the disclosure.

Ensemble learning can effectively improve prediction accuracy by combining several single classifiers in a system. As such, embodiments of the disclosure provide an ensemble learning method to construct a virtual metrology model. Referring to FIG. 4, FIG. 4 is schematic diagram showing an ensemble virtual metrology model according to some embodiments of the disclosure. As shown in FIG. 4, the ensemble virtual metrology model includes plural CNN models (a CNN model 1, a CNN model 2, . . . , a CNN model p) and a conjecture model 400, in which inputs of the CNN models are the sets of time series data of respective parameters, and plural outputs $y_1$-$y_p$ are inputs to the conjecture model 400. The conjecture model 400 is built in accordance a neural network (NN) algorithm, a multi-regression (MR) algorithm, a partial least square (PLS) algorithm or a support vector machines (SVM) algorithm. A parameter 1, a parameter 2, . . . , a parameter p are corresponding to the CNN model 1, the CNN model 2, . . . , the CNN model p in a one-to-one manner. This virtual reality model conducts a CNN operation on each parameter's data individually in succession of convolution, max pooling, flatten, dropout, and FC layers, for deriving the intermediate outputs $y_1$, $y_2$, ..., $y_p$. Then, this virtual reality model conducts ensemble on an extra FC layer (such as the conjecture model 400 that is a BPNN model) with the intermediate outputs being the input to generate the final virtual metrology value output.

Figure 5A:
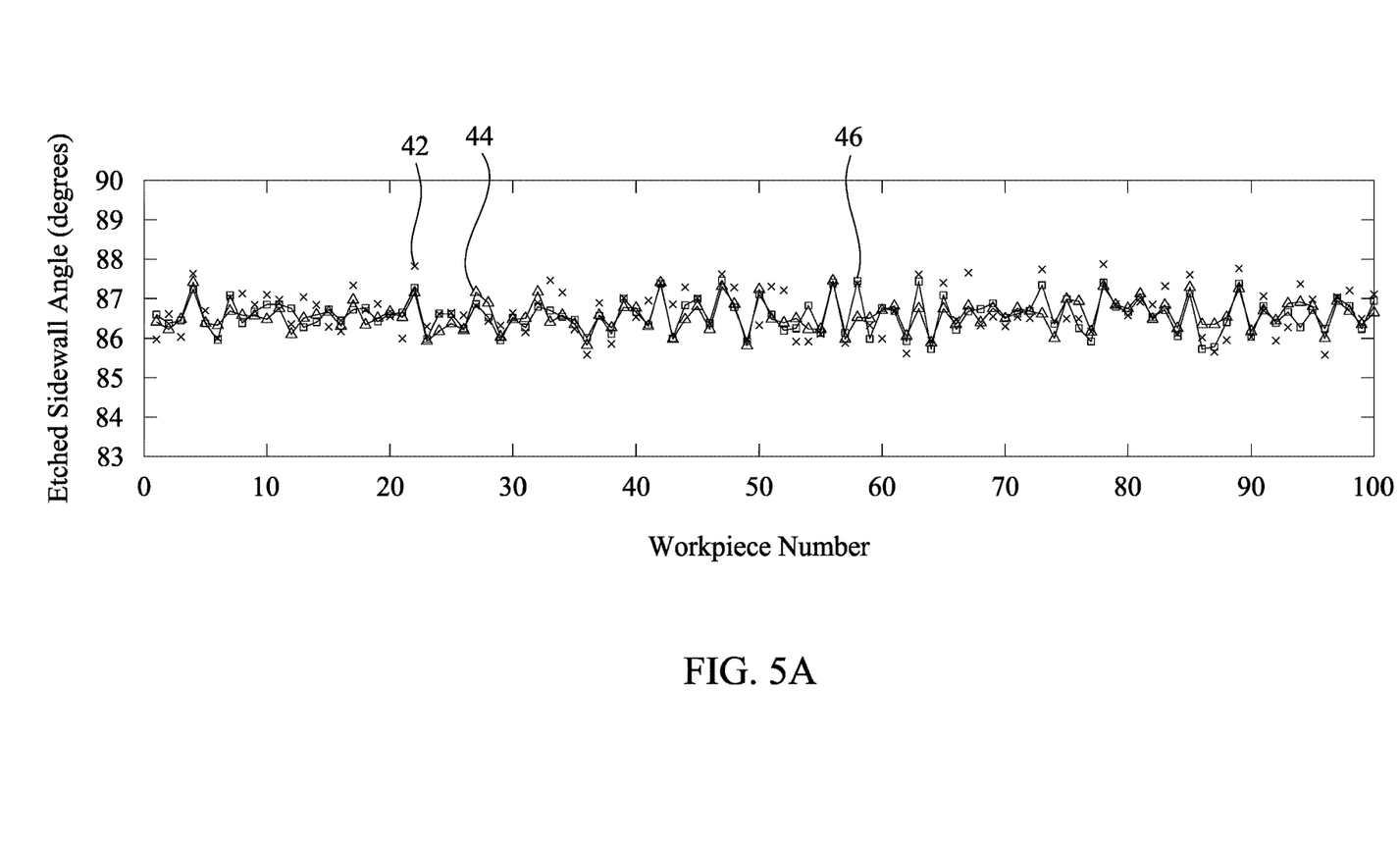
FIG. 5A shows prediction results of the application sample regarding etched sidewall angles.
Figure 5B:
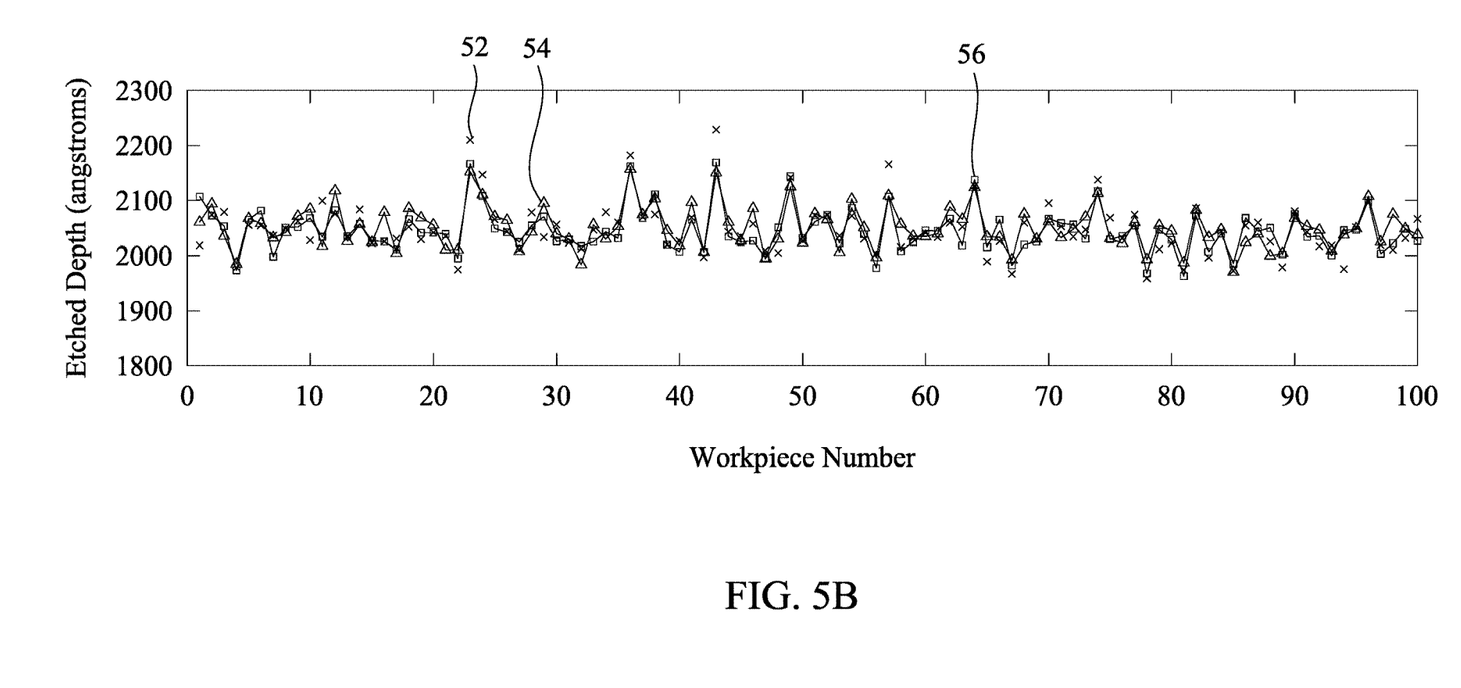
FIG. 5B shows prediction results of the application sample regarding etched depths.

Hereinafter, application examples regarding an etched depth and an etched sidewall angle are used to indicate the results of the aforementioned ensemble virtual reality model according to the embodiments of the disclosure. Referring to FIG. 5A, FIG. 5A shows prediction results of the application sample regarding etched sidewall angles, in which a curve 42 denoted by "x" represents actual etched side angles of the workpieces; a curve 44 denoted by triangles represents predicted etched side angles of the workpieces by using the conventional BPNN model; and a curve 46 denoted by squares represents predicted etched side angles of the workpieces by using the ensemble virtual reality model of the disclosure shown in FIG. 4. The mean absolute error (MAE) of the curve 44 is 0.383 degrees, and the coefficient of determination ($R^2$) of the curve 44 is 0.640. The mean absolute error (MAE) of the curve 46 is 0.326 degrees, and the coefficient of determination ($R^2$) of the curve 46 is 0.708. Referring to FIG. 5B, FIG. 5B shows prediction results of the application sample regarding etched depths, in which a curve 52 denoted by "x" represents actual etched depths of the workpieces; a curve 54 denoted by triangles represents predicted etched depths of the workpieces by using the conventional BPNN model; and a curve 56 denoted by squares represents predicted etched depths of the workpieces by using the ensemble virtual reality model of the disclosure shown in FIG. 4. The mean absolute error (MAE) of the curve 54 is 22.86 angstroms, and the coefficient of determination ($R^2$) of the curve 54 is 0.791. The mean absolute error (MAE) of the curve 56 is 18.83 angstroms, and the coefficient of determination ($R^2$) of the curve 56 is 0.849. It is noted that the smaller the MAE is, the higher the accuracy is; and the larger the $R^2$ is, the stronger the explanatory power is. Hence, the ensemble virtual reality model provided by the embodiments of the disclosure is superior to the conventional BPNN model.

It is understood that the virtual metrology method using the convolutional neural network (CNN) is performed by the aforementioned operations. A computer program of the present disclosure stored on a non-transitory tangible computer readable recording medium is used to perform the method described above. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

It is also noted that the present disclosure also can be described in the context of a manufacturing system. Although the present disclosure may be implemented in semiconductor fabrication, the present disclosure is not limited to implementation in semiconductor fabrication and may be applied to other manufacturing industries, in which the manufacturing system is configured to fabricate workpieces or products including, but not limited to, microprocessors, memory devices, digital signal processors, application specific integrated circuits (ASICs), or other similar devices. The present disclosure may also be applied to workpieces or manufactured products other than semiconductor devices, such as vehicle wheels, screws. The manufacturing system includes one or more processing tools that may be used to form one or more products, or portions thereof, in or on the workpieces (such as wafers, glass substrates). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

It can be known from the above that, the application of the embodiments of the present disclosure can effectively use the CNN to perform virtual metrology, and thus the accuracy of virtual metrology can be increased compared to the conventional virtual metrology.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A virtual metrology method using a convolutional neural network (CNN), the virtual metrology method comprising:
  obtaining a plurality of sets of process data, wherein the sets of process data are used or generated by a production tool when a plurality of workpieces are processed by the production tool, and the sets of process data are one-to-one corresponding to the sets of workpieces, and each of the sets of process data comprises values of a plurality of parameters, and the values of each of the parameters are respectively corresponding to a plurality of sets of time series data of the workpieces;
  performing a data alignment operation onto the sets of process data, the data alignment operation comprising:
    performing a frequency distribution calculation with respect to a data length of each of the sets of time series data of each of the parameters, thereby obtaining a distribution of appearance frequencies versus data lengths, wherein the data length with the largest appearance frequency in the sets of time series data of each of the parameters is a reference data length;
    performing a mean calculation on the sets of time series data with the reference data length in the sets of time series data of each of the parameters, thereby obtaining a set of reference time series data of each of the parameters;
    calculating a distance between each of the sets of time series data of each of the parameters and its corresponding reference time series data by using a dynamic time warping (DTW) algorithm;
    setting a distance threshold;

deleting the set of process data corresponding to the distance when the distance is greater than the distance threshold; and
performing a data-length adjusting operation to repeat adding at least one data point having the value of an end data point of each of the sets of time series data of each of the parameters after the end data point until the data length of each of the sets of time series data of each of the parameters is equal to a longest data length of the sets of process data;
obtaining a plurality of actual measurement values of the workpieces;
performing a model-building operation to build a virtual metrology model by using the sets of process data and the actual measurement values, the virtual metrology model comprising at least one CNN model; and
after the data alignment operation is performed on another set of process data of another workpiece, inputting the another set of process data of the another workpiece into the virtual metrology model to compute a virtual metrology value of the another workpiece;
wherein the virtual metrology value is used to process the another workpiece by the production tool;
wherein the virtual metrology method further comprises:
setting an upper limit of data length before the data-length adjusting operation is performed; and
deleting at least one of the sets of the process data if the data length of the at least one of the sets of the process data is greater than the upper limit of data length;
wherein the upper limit of data length is Q3+k×IQR, wherein Q3 stands for a third quartile of data lengths in the distribution of appearance frequencies versus data lengths which are arranged from smallest to largest, and IQR stands for an interquartile range in the distribution of appearance frequencies versus data lengths which are arranged from smallest to largest, and k is a constant greater than 0.

2. The virtual metrology method of claim 1, wherein an operation of setting the distance threshold is performed by applying a cross validation's leave-one-out (LOO) method.

3. The virtual metrology method of claim 1, wherein the virtual metrology model comprises a plurality of CNN models and a conjecture model, wherein a plurality of inputs are the sets of time series data of the parameters, and a plurality of outputs of the CNN models are inputs of the conjecture model.

4. The virtual metrology method of claim 3, wherein the conjecture model is built in accordance a neural network (NN) algorithm, a multi-regression (MR) algorithm, a partial least square (PLS) algorithm or a support vector machines (SVM) algorithm.

5. A computer program product stored on a non-transitory tangible computer readable recording medium, which, when executed, performs a virtual metrology method using a convolutional neural network (CNN), the method comprising:
obtaining a plurality of sets of process data, wherein the sets of process data are used or generated by a production tool when a plurality of workpieces are processed by the production tool, and the sets of process data are one-to-one corresponding to the sets of workpieces, and each of the sets of process data comprises values of a plurality of parameters, and the values of each of the parameters are respectively corresponding to a plurality of sets of time series data of the workpieces;
performing a data alignment operation onto the sets of process data, the data alignment operation comprising:
performing a frequency distribution calculation with respect to a data length of each of the sets of time series data of each of the parameters, thereby obtaining a distribution of appearance frequencies versus data lengths, wherein the data length with the largest appearance frequency in the sets of time series data of each of the parameters is a reference data length;
performing a mean calculation on the sets of time series data with the reference data length in the sets of time series data of each of the parameters, thereby obtaining a set of reference time series data of each of the parameters;
calculating a distance between each of the sets of time series data of each of the parameters and its corresponding reference time series data by using a dynamic time warping (DTW) algorithm;
setting a distance threshold;
deleting the set of process data corresponding to the distance when the distance is greater than the distance threshold; and
performing a data-length adjusting operation to repeat adding at least one data point having the value of an end data point of each of the sets of time series data of each of the parameters after the end data point until the data length of each of the sets of time series data of each of the parameters is equal to a longest data length of the sets of process data;
obtaining a plurality of actual measurement values of the workpieces;
performing a model-building operation to build a virtual metrology model by using the sets of process data and the actual measurement values, the virtual metrology model comprising at least one CNN model; and
after the data alignment operation is performed on another set of process data of another workpiece, inputting the another set of process data of the another workpiece into the virtual metrology model to compute a virtual metrology value of the another workpiece;
wherein the virtual metrology value is used to process the another workpiece by the production tool;
wherein the method further comprises:
setting an upper limit of data length before the data-length adjusting operation is performed; and
deleting at least one of the sets of the process data if the data length of the at least one of the sets of the process data is greater than the upper limit of data length;
wherein the upper limit of data length is Q3+k×IQR, wherein Q3 stands for a third quartile of data lengths in the distribution of appearance frequencies versus data lengths which are arranged from smallest to largest, and IQR stands for an interquartile range in the distribution of appearance frequencies versus data lengths which are arranged from smallest to largest, and k is a constant greater than 0.

6. The computer program product of claim 5, wherein an operation of setting the distance threshold is performed by applying a cross validation's leave-one-out (LOO) method.

7. The computer program product of claim 5, wherein the virtual metrology model comprises a plurality of CNN models and a conjecture model, wherein a plurality of inputs are the sets of time series data of the parameters, and a plurality of outputs of the CNN models are inputs of the conjecture model.

8. The computer program product of claim 7, wherein the conjecture model is built in accordance a neural network (NN) algorithm, a multi-regression (MR) algorithm, a partial least square (PLS) algorithm or a support vector machines (SVM) algorithm.

* * * * *